United States Patent [19]
Cattorini

[11] Patent Number: 5,955,725
[45] Date of Patent: Sep. 21, 1999

[54] DIGITIZING CCD ARRAY SYSTEM

[75] Inventor: Joseph Francis Cattorini, Melbourne, Fla.

[73] Assignee: DBA Systems, Inc., Melbourne, Fla.

[21] Appl. No.: 08/898,955

[22] Filed: Jul. 23, 1997

Related U.S. Application Data

[62] Division of application No. 08/569,453, Dec. 8, 1995, Pat. No. 5,682,033.

[51] Int. Cl.⁶ .............................. H01J 40/14; H04N 3/14
[52] U.S. Cl. ...................... 250/208.1; 358/475; 358/483; 358/494
[58] Field of Search .............................. 250/208.1, 208.2, 250/234, 235, 236, 216; 358/443, 447, 448, 450, 465, 471, 474, 475, 482, 483, 487, 494

[56] References Cited

U.S. PATENT DOCUMENTS

| | | | |
|---|---|---|---|
| 3,952,290 | 4/1976 | Williams | 340/173 |
| 4,408,231 | 10/1983 | Bushaw et al. | 358/280 |
| 4,884,224 | 11/1989 | Hirosawa | 364/550 |
| 5,093,734 | 3/1992 | Gerlach | 358/474 |
| 5,099,359 | 3/1992 | Hrycin et al. | 250/208.1 |
| 5,192,856 | 3/1993 | Schaham | 235/462 |
| 5,221,848 | 6/1993 | Milch | 250/208.1 |
| 5,252,818 | 10/1993 | Gerlach et al. | 250/208 |
| 5,410,144 | 4/1995 | Lavelle et al. | 250/208.1 |
| 5,416,611 | 5/1995 | Tandon | 250/208.1 |

*Primary Examiner*—Edward P. Westin
*Assistant Examiner*—John R. Lee
*Attorney, Agent, or Firm*—Pollock, Vande Sande & Priddy

[57] ABSTRACT

A digitizing CCD array system calibrates the CCD array precisely, masks a data medium automatically, and recovers data from the data medium accurately. The system uses a substantially opaque film mask to eliminate the effects of diffused light and flare during a digitization process when the data medium is smaller than an illumination source. A multiple optical density filters are used in calibrating the CCD array to provide a precise optical density reference for digitization of the data medium. In addition, the invention increases contrast sensitivity in data recovery by selectively switching the CCD array on and off to control the duration of multiple exposure times, i.e., integration periods, during a single line scan.

8 Claims, 6 Drawing Sheets

DIGITIZING CCD ARRAY SYSTEM

This application is a divisional application of U.S. patent application Ser. No. 08/569,453, filed Dec. 8, 1995 now U.S. Pat. No. 5,682,033.

FIELD OF THE INVENTION

This invention relates to a charge coupled device (CCD) array for digitizing data on a data medium, and in particular, a system for calibrating the CCD array, masking the data medium from extraneous illumination, and converting data on the data medium from analog to digital representation.

BACKGROUND OF THE INVENTION

Like most optical sensors, a CCD array responds linearly to light intensity. A charge on the CCD array is directly proportional to the number of light photons striking a particular sensor. However, due to the electronics, the optics, the light source, and the sensor itself, a CCD array with many sensors (5000 for example) does not respond uniformly during data recovery and conversion to electric charge levels. This non-uniformity requires each sensor in the array to be calibrated or normalized to every other sensor through electronic and software compensation. This calibration is accomplished by determining the near saturation level (light output) and the dark level (quiescent output) of each sensor. These two points provide means to mathematically normalize the linear output of all sensors in the array by interpolating between the two values. This is based on an assumption that a linear relationship exists between an electric charge level and light intensity.

Data on a data medium having an optical density (OD) range of 0.0 to 6.0 is typically recovered using sensors which have a dynamic optical density of 3.0 decibels, employing multiple light levels and exposure times. In this case, there has been no automatic means to accurately calibrate the sensors to reference the output digital values to optical densities of the data medium.

Unfortunately, the CCD array sensors do not always exhibit the linear relationship beyond optical density of 3.0 decibels. In fact, major deviations occur near the dark level output. This non-linearity causes deviation in calibration, and consequently makes any reference to optical density inaccurate which may interfere with the data recovery from the data medium, i.e., film.

Furthermore, the CCD array for reading data from the data medium normally possesses a fixed field of view. When reading data from the data medium which is smaller than the fixed field of view of the CCD array, the extraneous illumination beyond the edges of the data medium yields undesirable flare. The flare increases the charge of all sensors in the array reducing the reliability of the process. To reduce the unwanted effect of this flare, manual masking is usually employed around the edges of the data medium.

As stated above, the CCD sensor possesses limited dynamic range of optical density due to the limited number of photons that can be accumulated in each sensor. The number of photons is directly proportional to the intensity of illumination reaching each sensor. Since $I=I_0/10^{OD}$, where I is the intensity of transmitted illumination,
$I_0$ is the intensity of incident illumination, and
OD is optical density of the data medium, the intensity of transmitted illumination is reduced by a factor of 10 for each integral value of optical density, provided that the intensity of the transmitted illumination remains constant.

For example, 99% of the light is absorbed by a data medium of optical density 2.0. Thus, the ability to discriminate one optical density from another, i.e., contrast sensitivity, is extremely reduced after only 2 decades of optical density, leaving only 1% of the light for logarithmic distribution among the remaining optical densities.

To recover data from a data medium possessing greater than 2 decades of density with significant contrast sensitivity, several succeeding scans of the data medium at different light levels and/or different integration periods are necessary. Multiple succeeding scans are time-consuming and cumbersome due to the retrieval and re-insertion of the data medium.

A need, therefore, exists for a digitizing CCD array system which overcomes the above disadvantages of the existing digitizing systems.

OBJECTS OF THE INVENTION

It is therefore an object of the invention to calibrate each sensor in a CCD array accurately to obtain a precise relationship of an electric charge level versus light intensity.

It is another object of the invention to recover data from an optically read data medium by eliminating the effects of diffused light and flare during a digitization process.

It is yet another object of the invention to improve contrast sensitivity when reading data from an optically read data medium during a digitization process.

SUMMARY OF THE INVENTION

These and other objects, features and advantages are accomplished by the present invention.

In one aspect of the invention, a digitizing CCD array system for recovering data includes an illumination source which generates a light beam to illuminate the data medium, providing an image of the data medium on the CCD array which produces an electric signal having a magnitude proportional to the incident light intensity. Adjacent the data medium is a substantially opaque film, hereinafter referred to as a "mask", which is located in the plane of the data medium. The mask partially shields the illumination source from illuminating areas outside the data medium to prevent flare during the digitization process.

Further in accordance with another aspect of the invention, a motor displaces the mask via a pair of sprockets on a shaft. The sprockets translate the mask to partially block the light beam. A lens is located in a path of the light beam which illuminates the data medium and the mask. The lens focuses the light beam onto the CCD array which converts the focused light beam into an electric charge representing information recorded on the data medium.

In another aspect of the invention, a light beam from the illumination source traverses the data medium and then passes through the lens. The lens focuses the light beam onto the CCD array which includes integration control means for alternately switching the charge coupled device on and off during a single line scan of the data medium. The alternate switching of the CCD produces a multiple of exposure time periods, resulting in the CCD array accumulating a different charge level for each exposure time period. Connected to the CCD array are processing means which, for each pixel, process multiple digital representations corresponding to each of the multiple exposure time periods. A single digital representation is then selected from these multiple digital representations, which corresponds to an optical density of the data medium. Thus, the multiple images are merged into a single image by an algorithm that provides a harmonious blending which yields a wide dynamic range with excellent contrast sensitivity.

In yet another aspect of the invention, calibration of the invention is implemented by an optical filter mechanism comprising filters of various optical densities. The optical filter mechanism is positioned between the film and the mask for calibrating the CCD array for each of the multiple exposure time periods.

BRIEF DESCRIPTION OF THE DRAWINGS

The above-mentioned as well as additional advantages and features of the present invention will be evident and more clearly understood when considered in conjunction with the accompanying drawings, in which.

In all Figures, like reference numerals represent the same or identical components of the present invention.

DESCRIPTION OF THE PREFERRED EMBODIMENT

Figure 1:
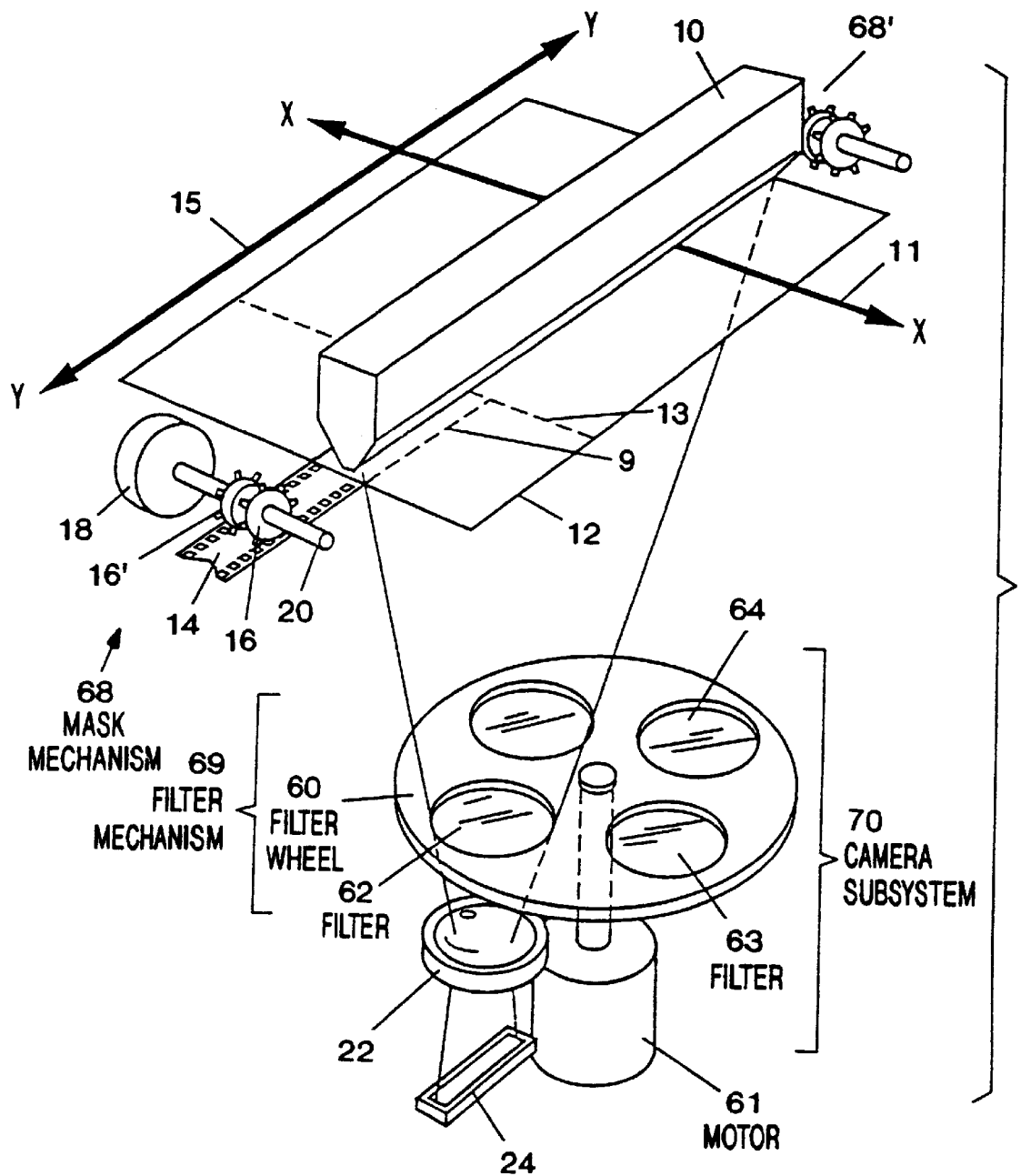
FIG. 1 is an illustration of one embodiment of the disclosed digitizing CCD array system.
Figure 2:
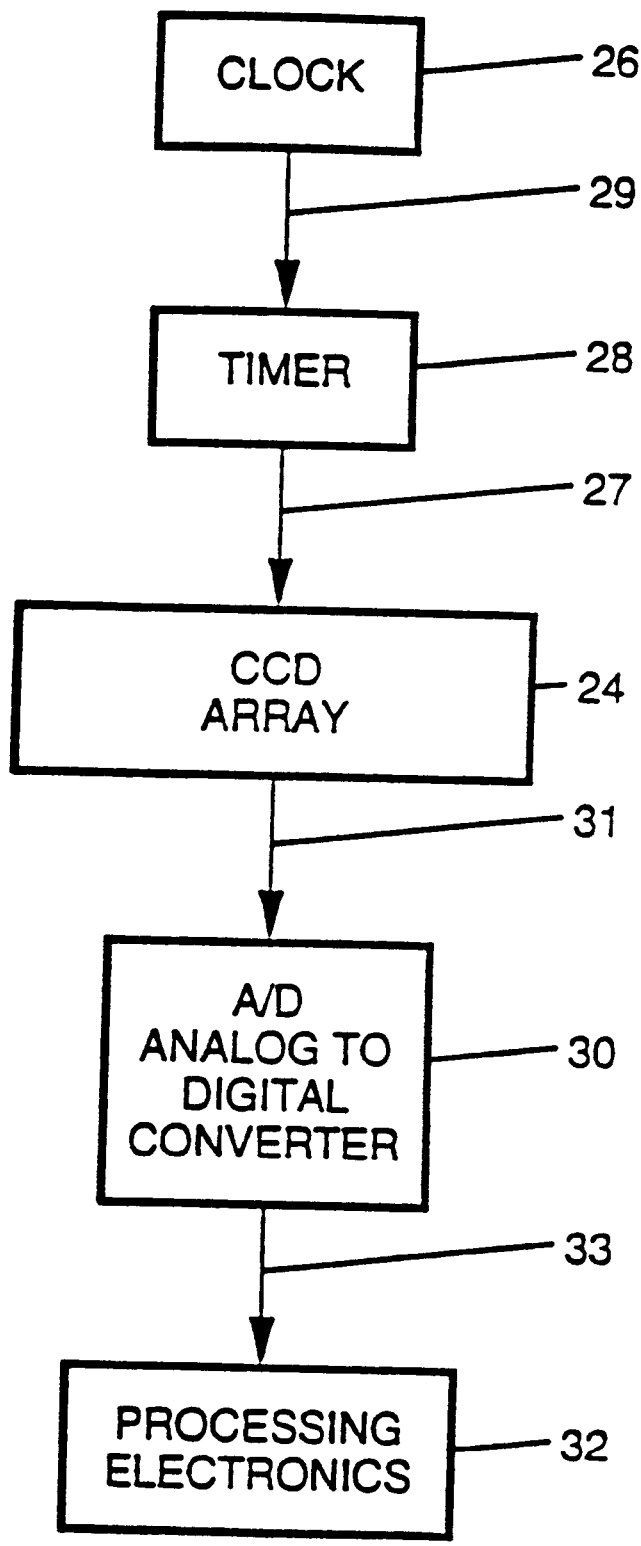
FIG. 2 is a block diagram of electronic components of the disclosed digitizing CCD array system, which process electric charge levels accumulated in the CCD array.

First, an overview of components in one embodiment of the disclosed digitizing CCD array system is presented during a general operation of the system with reference to FIGS. 1 and 2.

FIG. 1 is an illustration of one embodiment of the disclosed digitizing CCD array system. A light source, such as a line illuminator 10, generates a light beam across the width of a data medium 12 from which the information is recovered. The data medium 12 is typically scanned on a line-by-line basis by moving the data medium 12 in the direction of the X—X axis 11, as indicated in FIG. 1.

In one embodiment of the invention, a mask mechanism 68 is positioned adjacent the data medium 12. The mask mechanism 68 comprises a motor 18 which includes a shaft 20 and a pair of sprockets 16 and 16' fixedly attached to the shaft 20. The shaft 20 and the sprockets 16 and 16' are rotated by the motor 18 during its operation. The sprockets 16 and 16' engage a substantially opaque film mask 14 for transporting it partially across the width of the data medium 12, as shown by the dash lines 9 of FIG. 1. Under the operation of the motor 18, the mask 14 can also be retracted to a non-functional position of not covering any portion of the data medium 12 or the line illuminator 10. As clearly seen in FIG. 1, the mask 14 can be fully extended to cover the width of the data medium 12 and the line illuminator 10.

The second mask mechanism 68', partially shown in FIG. 1, exists on the opposite side of the line illuminator 10.

An optical density filter mechanism 69 is interposed between a lens 22 and the data medium 12. This mechanism 69 includes a filter mechanism motor 61 which rotates a filter wheel 60. The filter wheel 60 holds multiple filters, among them a near zero optical density filter 62, a typical mid-range filter 63, and another filter 64. In this exemplary embodiment, the filters 63 and 64 are selected to have an optical density of 2.0 and 4.0, respectively.

The light beam from the line illuminator 10 passes through the data medium 12, as well as the mask 14 in certain situations, and is focused by the lens 22. The focused light beam then strikes a CCD array 24 which accumulates the photons. The accumulated photons are then converted by the CCD array 24 into electric charges representing recorded information of the data medium 12. The electric charges accumulated in the CCD array 24 represent a line of information simultaneously scanned across the data medium 12. To scan the next line of information recorded on the data medium 12, typically the data medium 12 is shifted in the direction of the X—X axis 11, and the process is repeated from the beginning.

FIG. 2 is a block diagram of the electronic components which process the photons and electric charge levels accumulated in the CCD array 24.

In general, the CCD array 24 typically accumulates photons to its capacity as long as the light beam illuminates the array's photosensitive surface. When the accumulated photons reach the predetermined capacity level of the individual sensors, a signal 27 is transmitted to the CCD array 24 to stop accumulating the photons. After the individual sensors reach the saturation level, no further information can be obtained from the CCD array 24 even if the sensors continue to be exposed to the illumination. While the signal 27 is maintained, the CCD array 24 is precluded from receiving additional photons even though exposed to the light beam. The accumulation of photons by the CCD array 24 is effectively prevented as long as the signal 27 is active. In the disclosed system, a timer 28 and a clock 26 automatically control the CCD array 24, as will be explained later in the description.

Continuing with the description of FIG. 2, the signal 27 stops the CCD array 24 from accumulating photons striking the photosensitive surface. Regardless of whether the CCD array 24 reached the saturation level, the accumulated photons are converted into electric charges. The electric charges are then output to an analog-to-digital (A/D) converter 30 via a line 31 for conversion to a digital representation. From the A/D converter 30, the digital representations of various charge levels corresponding to the information on the data medium 12 are sent to processing electronics 32 via a line 33 for further processing of the information.

Figure 4:
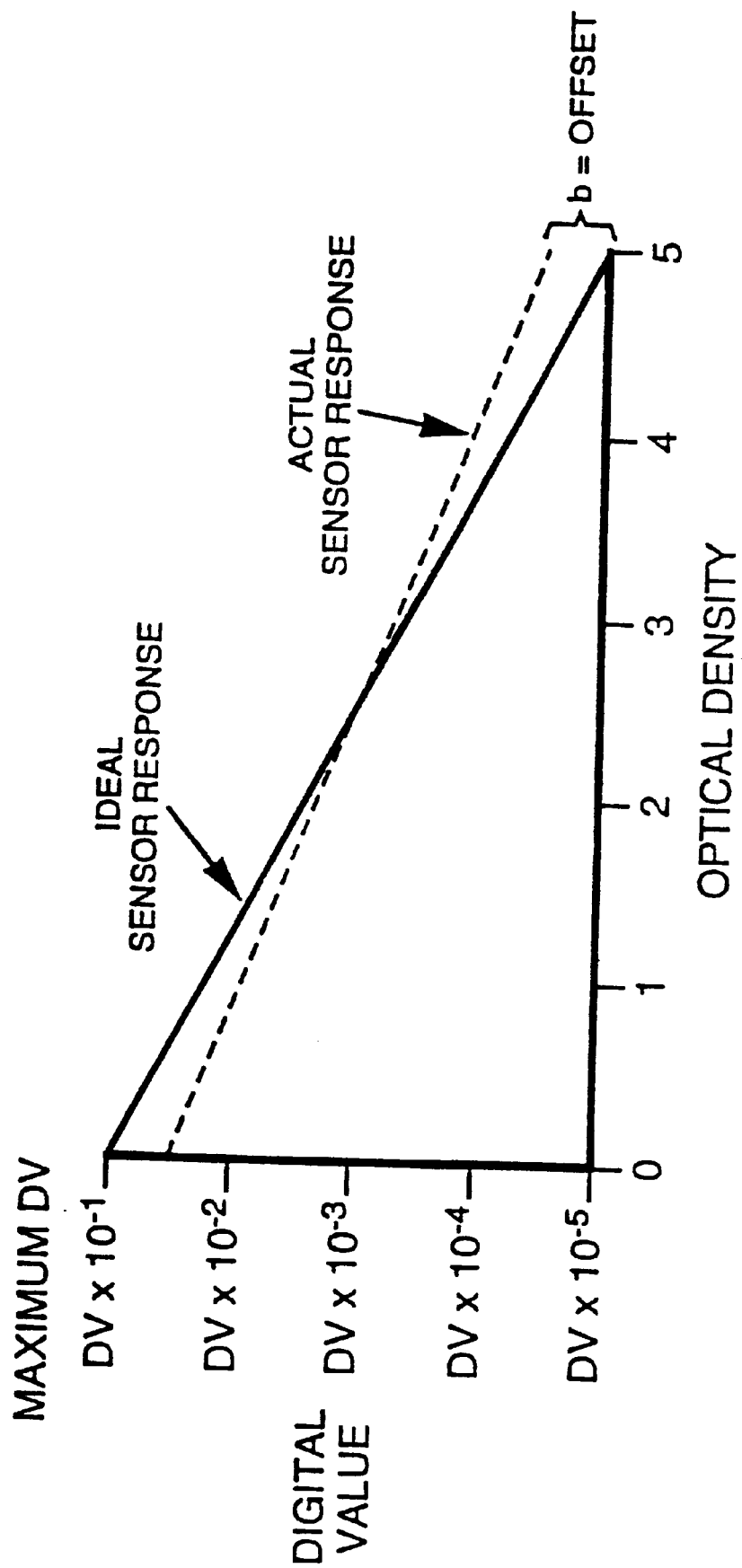
FIG. 4 is a graph depicting the difference between an ideal and actual CCD sensor responses.

Next, the detailed operation of the disclosed system is described with reference to FIGS. 1 and 2. Prior to recovering data from the data medium 12, the digitizing system must be calibrated to accurately represent the recorded data due to a difference between the ideal and actual responses as shown in FIG. 4. Using the apparatus and method described herein, the disclosed system achieves the accurate calibration to provide an optical density reference for the data medium 12. By subtracting a near quiescent response value of each sensor and multiplying by a scale factor, each sensor can be normalized to respond similarly to every other sensor.

Referring to FIG. 1, to calibrate the digitizing CCD array system, the data medium 12 is initially removed from the light beam of the line illuminator 10. In addition, the motor 18 is activated to retract the mask 14 to its original, non-functional position of not covering any part of the line illuminator 10. Next, the near zero optical density filter 62 is introduced into a path of the light beam. The filter 62 is attached to the filter wheel 60 and positioned by the filter mechanism motor 61.

The line illuminator 10 is then turned on to illuminate the CCD array 24 with a light beam emitted from the line illuminator 10. In response to the light beam emitted from the line illuminator 10 and focused by the lens 22, the CCD array 24 acquires, via the conversion of the photons, a first numerical quantity of electric charges.

During the accumulation of charges, the intensity of the light beam is held constant, while duration of the exposure time, i.e., integration period, is controlled by the timer 28 which activates the signal 27 to the CCD array. The integration period, selected as 0.3 msec in one embodiment of the present invention, is empirically found such that any sensor in the CCD array 24 reaches the near saturation value. In the 16-bit digital representation, the saturation value is 65536. The conversion of photons to electric charges and from analog to digital representation produces the scale factor for each sensor. Thus, the scale factors for various sensors in the CCD array 24 may be 65536/65500, 65536/65510, etc. The processor 32 subsequently stores the scale factor for each sensor responsive to the first illumination. After the transfer of the electric charges, the sensors become available for accumulation of another electric charge level.

The filter mechanism motor 61 is subsequently activated to bring the filter 63 of optical density 2.0 into the path of the light beam. While the line illuminator 10 is maintained at the previous intensity, the timer 28 is again activated for 0.3 msec integration period. The signal 27 is de-asserted enabling the CCD array 24 to start accumulating photons.

At the expiration of the 0.3 msec integration period controlled by the timer 28, the signal 27 is activated to prohibit further accumulation of photons. The electric charge level is then converted to a digital value by the A/D converter 30. This digital value becomes the offset factor for each sensor in the CCD array 24.

Using the previously stored scale factor at the optical density of 0.0 and the offset factor at the optical density of 2.0, the look-up table is created for the 0.0–2.0 optical density range. Each sensor can thus be normalized for the optical density range 0.0–2.0. For example, while recovering the actual data from the data medium 12, a sensor may produce a digital value corresponding to 31,200 in the decimal notation. This value is then adjusted by subtracting the offset factor and multiplying by the scale factor, respectively.

Next, after creating the look-up table for the 0.0–2.0 optical density range, an analogous calibration procedure is employed for normalizing sensors in the 2.0–4.0 optical density range. The filter 63 of 2.0 optical density is maintained in its position while the line illuminator 10 is kept at the previous intensity level. The exposure time, i.e., integration period, is increased to a second predetermined value. Similar to the first integration period of 0.3 msec, this integration period, selected as 30 msec in one embodiment of the present invention, is empirically found such that any sensor in the CCD array 24 reaches the near saturation value.

In response to the light beam which passes through the filter 63 and is focused by the lens 22, the CCD array 24 acquires another electric charge level for each sensor, preceded by the conversion of the photons. This charge level is then converted to a digital form, representing a scale factor for each sensor. During this integration period, also terminated by the signal 27 to the CCD array 24, the intensity of the light beam is kept substantially the same as in the previous illuminations, while the integration period is appropriately adjusted to bring the sensors in the CCD array 24 to the near saturation level. Consequently, the integration period is 100 longer in the exemplary embodiment, because the more opaque filter 63 is now positioned between the CCD array 24 and the line illuminator 10 allowing less light to reach the sensors. The sensors, therefore, must be exposed to the light beam for a longer time to achieve near saturation level while accumulating the photons.

Further in accordance with the invention, the motor 61 is activated to introduce another filter 64 of the 4.0 optical density into the path of the light beam. The line illuminator 10 is again maintained at the original intensity level. The timer 28, set for a 30 msec integration period, deactivates the signal 27 to enable the CCD array 24 to start accumulating photons. When the timer expires in 30 msec, the signal 27 is asserted to prohibit further accumulation of photons. The A/D converter 30 converts the electric charge level to a digital value for each sensor. This digital value becomes the offset factor for each sensor in the CCD array 24 for the 2.0–4.0 optical density range.

Using the previously stored scale factor at the 2.0 optical density and the offset factor at the 4.0 optical density, the look-up table is created for the 2.0–4.0 optical density range. Each sensor can thus be normalized for the optical density range 2.0–4.0.

Ideal and actual linear sensor responses are shown in FIG. 4. By subtracting the quiescent response (b value) of each sensor and multiplying by a multiplication factor, each sensor can be normalized to respond similarly to every other sensor.

The above discussion described the steps for obtaining calibration of the sensors for the optical density ranges 0.0–2.0 and 2.0–4.0. It is well understood, however, that if the calibration of the CCD array 24 is required with greater precision, additional filters of various optical densities between 0.0 and 4.0 can be used to normalize the sensors at additional optical density levels. Similarly, if calibration is desired at an optical density greater than 4.0, appropriate filters in the filter wheel 60 may be inserted for placing into the path of the light beam.

Once the CCD array 24 is accurately calibrated in accordance with the previous description, the data recovery by the disclosed digitizing CCD array system can then begin. Again referring to FIG. 1, the data medium 12 is positioned between the line illuminator 10 and the lens 22. The line illuminator 10 generates the light beam which passes through the data medium 12.

In some instances, however, the width of the data medium 12 as indicated by the dash line 13, in the direction of the Y—Y axis 15, may be narrower than the line illuminator 10. Such condition results in illuminating extraneous areas outside the scan line of the data medium by the light beam which is emitted from the line illuminator 10. The flare from illuminating the outside areas adversely affects the sensitivity of other sensors in the CCD array 24 as described above. To shield the areas outside the data medium 12 from illumination, the substantially opaque mask 14 is positioned in the plane of the data medium 12. The mask 14 is transported by the motor 18 driving the shaft 20 and the sprockets 16 and 16' which engage the mask 14. The mask 14 is partially positioned over the line illuminator 10 to selectively cover its portions. Although still illuminating the areas outside the data medium 12, the light beam passing through those areas is effectively blocked by the opacity of the mask 14 from reaching the CCD array 24. By using the motor 18 to extend the mask 14 across the line illuminator 10, the mask 14 can be easily adjusted to match any width of the data medium 12 if it is narrower than the line illuminator 10.

Regardless of the need for the masking operation, the data recovery from the data medium 12 proceeds as follows. After passing through the data medium 12, the light beam is focused by the lens 22. The focused light beam strikes the CCD array 24 which accumulates the photons from the focused light beam. The CCD array 24 gathers the photons until it either saturates or receives the signal 27 to stop accumulating the photons.

In the disclosed invention, the CCD array 24 accumulates the photons from the light beam under the control of the clock 26 and the timer 28, as shown in FIG. 2. The clock 26 can be a crystal or other precise pulse generating means which continuously generates clock pulses 29. The timer 28 receives the clock pulses 29 and increments its internal count on every pulse. Upon reaching a predetermined count which can be selected via programming means, the timer 28 generates the signal 27 to stop the CCD array 24 from accumulating any additional photons from the illuminating light beam.

Integration period of the sensors is effectively controlled during a single line scan. To obtain a better contrast sensitivity, the disclosed system generates several integration periods of various duration during a single line scan. These integration periods correspond to the exposure times previously used during the calibration process of the sensors.

For example, during the first exposure of a single line of the data medium 12, the timer 28 counts for 0.3 milliseconds and produces the signal 27 upon reaching this terminal count. At this time, the sensors of the CCD array 24 stop accumulating photons. This integration period corresponds to the previously calibrated optical range 0.0–2.0. The second exposure of 30 milliseconds for the same line corresponds to the previously calibrated optical range 2.0–4.0.

Figure 3:
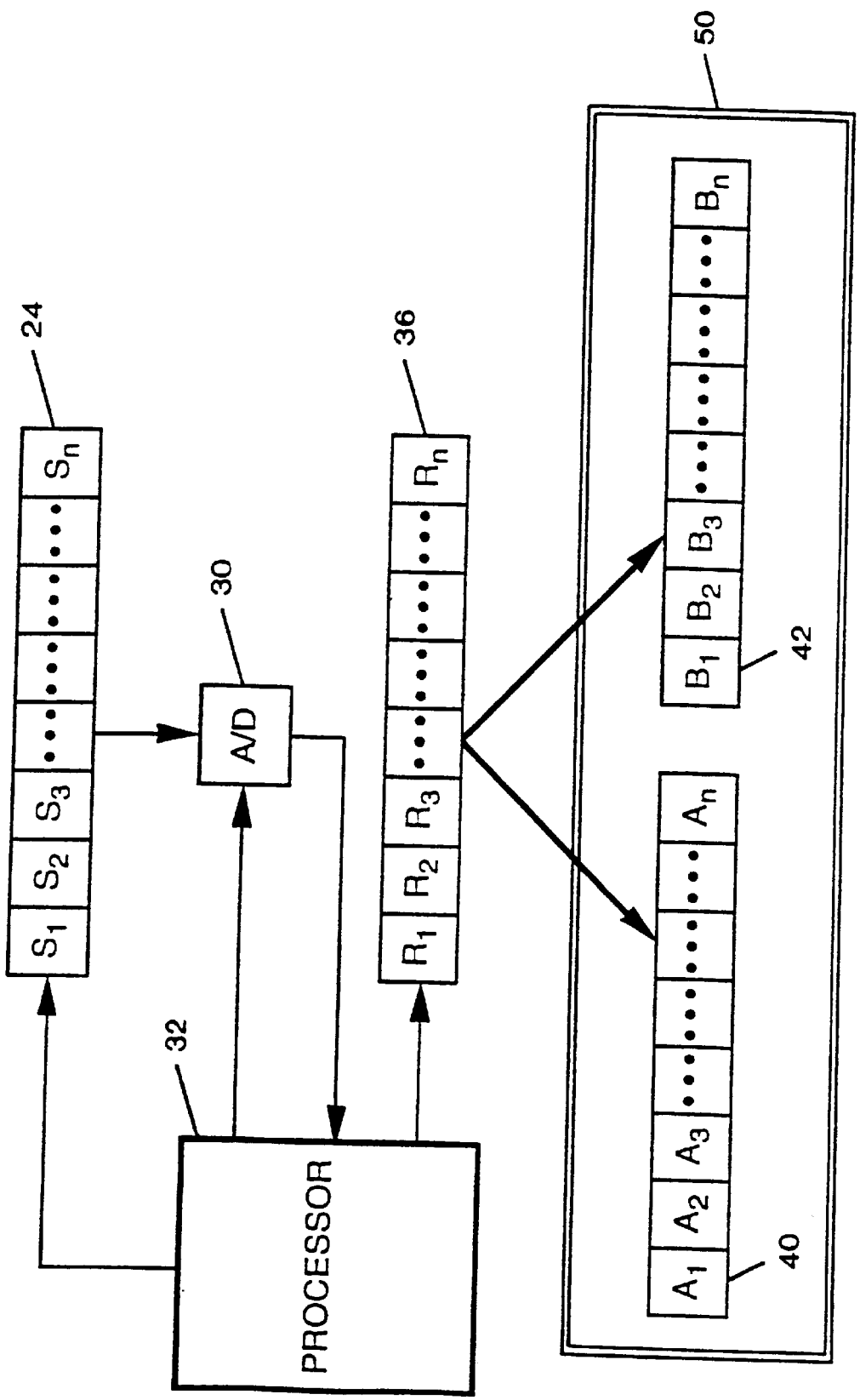
FIG. 3 is a more detailed block diagram of the electronic components of the disclosed digitizing CCD array system.

FIG. 3 shows a more detailed representation of electronic components in the disclosed invention. The photons are stored in a capacitive well in each individual sensor, such as sensors S1, S2, S3, etc. of the CCD array 24. The photons in each sensor are converted by the CCD array 24 into electrical charges in each sensor. The processor 32 then transfers the electric charge level in each sensor to the A/D converter 30.

Further continuing with FIG. 3, under the control of the processor 32, the digital values from the A/D converters are stored in a plurality of registers R1, R2, etc. of a memory buffer 36. Each register R1, R2, etc. stores the digital value of each sensor represented by a predetermined number of bits of information, such as 8, 12, 16, depending on the desired resolution. The digital values from the memory buffer 36 are then transferred alternately line-by-line to two identical memory banks, such as 40 and 42 located in a host system 50, so that the two images are produced: one representing data starting from 0.0 OD and another starting from 2.0 OD. Each of the memory banks 40, 42 is similarly configured as the memory buffer 36 for storing data from multiple integration scans.

During the above processing, the processor 32 applies scale and offset factors which were previously determined during the calibration. For example, during the first integration time of 0.3 milliseconds, scale and offset factors obtained during the calibration for 0.3 milliseconds are employed. This processing occurs for all data-bearing locations in a line of the data medium 12 which is scanned by the disclosed system. The digital representation, produced by each sensor and adjusted by the corresponding scale and offset factors, is stored in the memory bank 40 of the host system 50.

While the conversion and processing of the stored photons take place, the signal 27 is deactivated. When the signal 27 is inactive, the sensors resume photon accumulation. At this time, the timer 28, previously reset upon reaching the terminal count, again resumes counting the pulses 29 from the clock 26. This time, the timer 28 times out when it reaches 30 milliseconds. The signal 27 is then generated to the CCD array 24 stopping the sensors from accumulating additional photons. As described above, the stored photons in each sensor are converted by the CCD array 24 into electric charge levels which are converted by the A/D converter 30. The digital representation, produced by each sensor and adjusted by the corresponding scale and offset factors, is stored in the memory bank 42 of the host system 50.

Figure 5:
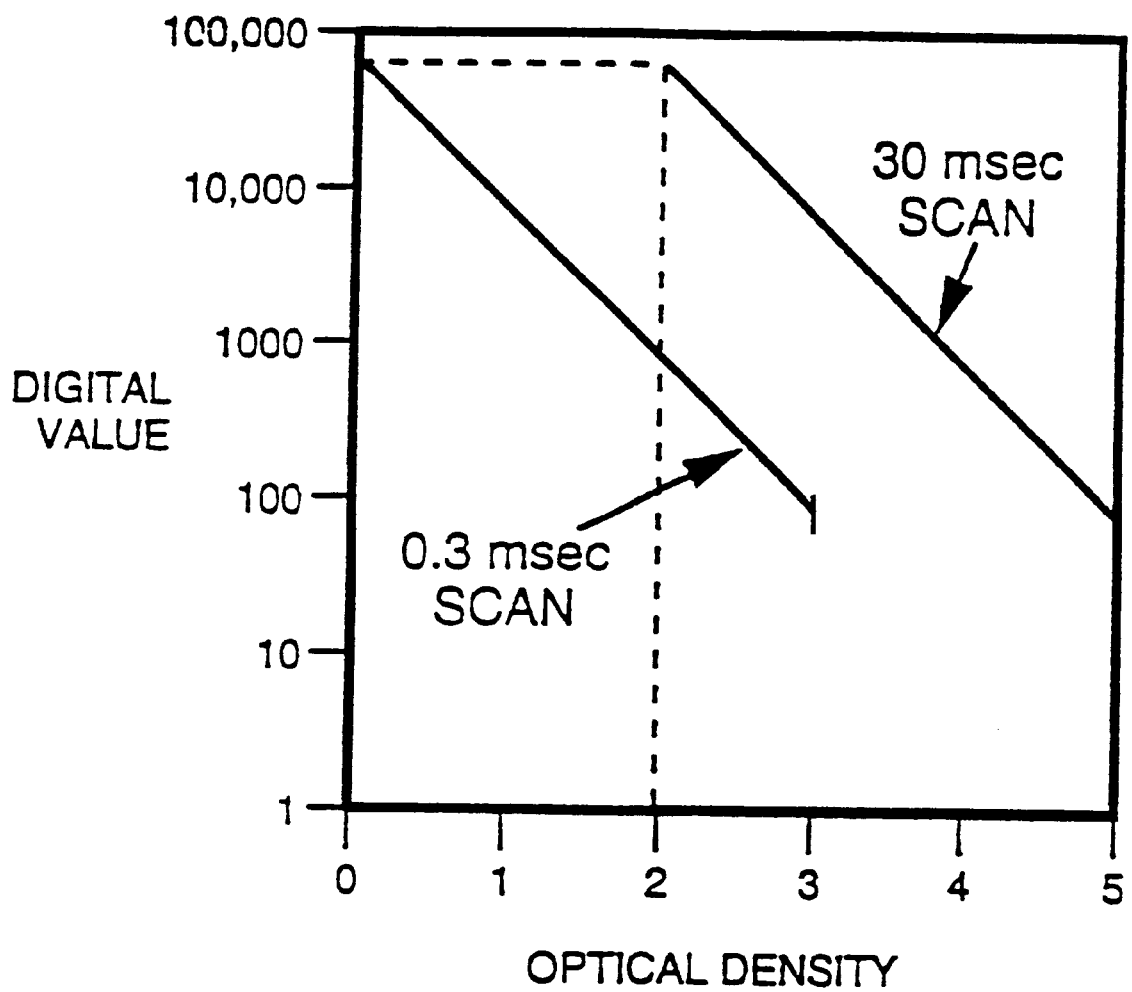
FIG. 5 is a graph showing the response (optical density versus digital value) of a single line scanned twice using different integration periods.

These two exposures occur in succession during a single line scan, illuminating essentially the same line of information on the data medium 12. Furthermore, the exposures correspond to the exposures during the calibration of the CCD array 24, as stated above. As a result, the first exposure of 0.3 milliseconds produces an electric charge level for the optical density range 0.0–2.0 of the data medium 12. The second exposure of 30 milliseconds produces an electric charge level for the optical density range 2.0–4.0 of the data medium 12. Thus, while the intensity of the light beam remains constant throughout these multiple exposures, change in the exposure duration produces illumination to the CCD array 24 which favorably matches the optical density ranges of the data medium 12 from which data is being recovered and converted into digital representation. The values versus optical density for the two images are depicted in FIG. 5.

Figure 6:
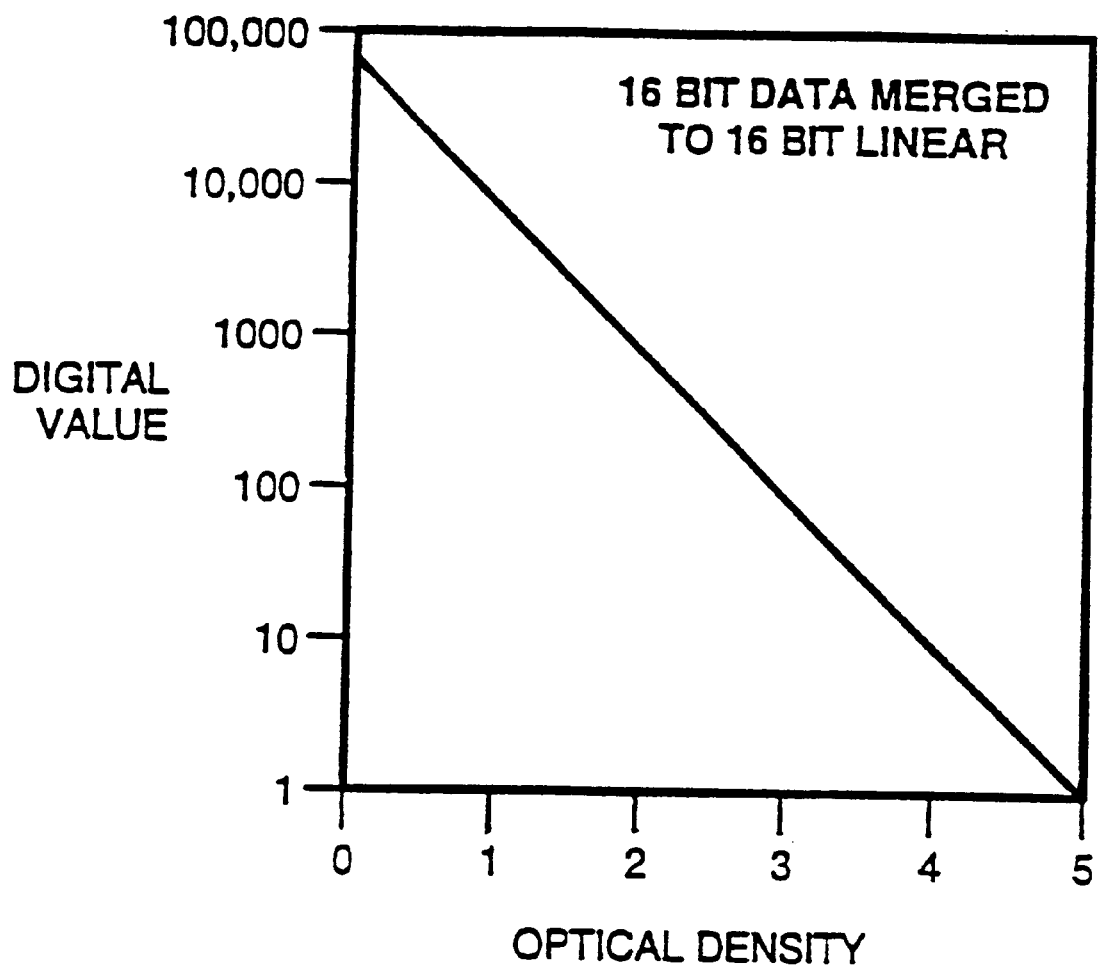
FIG. 6 is a graph showing the response (optical density versus digital value) of a single line scan merged from the dual integration scans of FIG. 5.

When the host system 50 receives multiple digital values during a single line scan, it selects the largest non-saturation digital value corresponding to the electric charge level converted from the data medium 12. If the host system 50, for example, receives two values of 12456 and 65536, it discards the saturation value of 65536 from consideration. The remaining value then becomes the digital representation for the data location on the data medium 12. Under control of a computer program, the host system 50 can distinguish between two arrays of digital values, i.e., digital values from the array A correspond to the optical density range 0.0–2.0, digital values from the array B correspond to the optical density range 2.0–4.0, etc. Based on the association of the position of each digital value with the corresponding optical density range, the digital value 3000 corresponds to the optical density range 2.0–4.0 and is a digital representation for the data-bearing location on the line scanned by the disclosed system. The basic concept of the single image algorithm utilizes digital values in the 30 msec scan that are not saturated (less than 65536 in a 16-bit resolution, for example) and digital values in the 0.3 msec scan that correspond to saturated pixels in the 30 msec scan. This is graphically shown in FIG. 6, where two images of FIG. 5 are merged into a single image providing a harmonious blending of the two sets of values.

The above description refers to a single location on the line of the data medium 12. It is understood, however, that the above steps are concurrently performed for all data-bearing locations of a single line during a line scan by the line illuminator 10. The data is, therefore, recovered from each data-bearing location during a single line scan, reflecting a greater contrast among various optical densities. The next line of the data medium 12 is scanned in the same manner, until data is recovered and converted to the digital representation for the entire data medium 12.

Since those skilled in the art can modify the disclosed specific embodiment without departing from the spirit of the invention, it is, therefore, intended that the claims be interpreted to cover such modifications and equivalents.

What is claimed is:

1. A method of recovering data from a data medium to increase contrast sensitivity in a digitization process of a charge coupled device array system, comprising:

generating a light beam to illuminate said data medium;

focusing said light beam via a lens; producing during a single line scan of said data medium a multiple of exposures for said data medium;

controlling duration of each exposure in said multiple of exposures;

converting each exposure into a corresponding electric charge level representing information recorded on said data medium; and processing a multiple of electric charge levels corresponding to said multiple of exposures by selecting from said multiple of electric charge levels a single charge level corresponding to an optical density of said data medium.

2. The method according to claim 1, wherein said processing comprises determining a digital representation of information on said data medium by selecting the largest non-saturation value from said multiple exposures.

3. The method of recovering data from a data medium according to claim 1 wherein said step of converting said exposure into a corresponding electric charge level comprises accumulating photons from said exposure onto an array of coupled devices.

4. The method of recovering data according to claim 3 wherein said step of controlling duration of said exposure comprises:

generating a time interval representing said exposure time; and inhibiting further accumulation of photons on said array of charge coupled devices following said duration of time.

5. The method for recovering data according to claim 4 wherein said time interval is substantially 0.3 milliseconds for one of said exposures.

6. The method for recovering data according to claim 4 wherein said time interval is substantially 30 milliseconds.

7. The method for recovering data according to claim 1 further comprising calibrating said array of charged coupled devices by:

obtaining a near quiescent value for each of said charge coupled devices;

subtracting said quiescent value from each electrical charge level produced from a respective charge coupled device;

obtaining a scale factor for each of said charge coupled devices to normalize the value of charge produced from each of said charge coupled devices with each other; and multiplying the charge level produced by each of said charge coupled devices with a respective scale factor.

8. The method according to claim 3 wherein said multiple exposures correspond to an optical density of said data medium of 0.0–2.0 and 2.0–4.0, respectively.

* * * * *